US009043760B2

(12) United States Patent
Fulton et al.

(10) Patent No.: US 9,043,760 B2
(45) Date of Patent: May 26, 2015

(54) CREATING DYNAMIC INTERACTIVE VIEWS FROM TRACE EVENTS FOR PERFORMING DETERMINISTIC PERFORMANCE ANALYSIS

(75) Inventors: Michael S. Fulton, Maple Ridge (CA); Shirish T. Shenvi Kuncolienkar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 381 days.

(21) Appl. No.: 13/466,757

(22) Filed: May 8, 2012

(65) Prior Publication Data
US 2013/0300744 A1    Nov. 14, 2013

(51) Int. Cl.
*G06F 9/44* (2006.01)
*G06F 11/00* (2006.01)
*G06T 11/20* (2006.01)

(52) U.S. Cl.
CPC .................. *G06T 11/206* (2013.01)

(58) Field of Classification Search
CPC ............ G06F 11/3636; G06F 11/3466; G06F 11/3476; G06F 2201/86; G06F 2201/865; G06F 11/3409
USPC ........................................................ 717/128
See application file for complete search history.

(56) References Cited

U.S. PATENT DOCUMENTS

| 5,649,085 A | 7/1997 | Lehr |
| 5,898,873 A | 4/1999 | Lehr |
| 7,131,113 B2 | 10/2006 | Chang et al. |
| 7,310,777 B2 | 12/2007 | Cirne |
| 7,802,233 B2 | 9/2010 | Weinert et al. |
| 8,516,301 B2 * | 8/2013 | Beck et al. ...................... 714/15 |
| 2002/0199172 A1 | 12/2002 | Bunnell |
| 2006/0248512 A1 | 11/2006 | Messmer et al. |

OTHER PUBLICATIONS

Heath, Michael T., et al., "The Visual Display of Parallel Performance Data", IEEE Computer, Nov. 1995, vol. 28, Issue 11, p. 21-28, ISSN 0018-9162.
Jankun-Kelly, T. J., et al., "A Model and Framework for Visualization Exploration", IEEE Transactions on Visualization and Computer Graphics, Mar.-Apr. 2007, vol. 13, Issue 2, p. 357-369, ISSN 1077-2626.
LeBlanc, Thomas J. et al, "Analyzing Parallel Program Executions Using Multiple Views", Journal of Parallel and Distributed Computing (1990),vol. 9, Issue: 2, pp. 203-217.
Malony, Allen D. et al., "Traceview: A Trace Visualization Tool", IEEE Software 8(5): 19-28 (1991).

* cited by examiner

*Primary Examiner* — Jason M Repko
*Assistant Examiner* — Scott E Sonners
(74) *Attorney, Agent, or Firm* — Marcia L. Doubet

(57) ABSTRACT

View definitions are created for deterministic performance analysis in real-time computing systems, and can then be used to present views for analyzing outliers that occur during runtime execution. Trace data created by a real-time application is compared to a set of view definitions to determine whether the trace data matches the view definition. If so, then related records from the trace are gathered according to specifications in the matched view definition, and calculations (such as elapsed time) can then be performed using the related records. A view definition may be created by prompting a user for selection of parameters to be programmatically inserted into a markup language document. A capability may be provided whereby a user can receive additional information (which is extracted from the trace data, according to specifications in the matched view definition) upon a user gesture such as hovering a selection means over a displayed view.

11 Claims, 22 Drawing Sheets

FIG. 3

```
public class AsynEventTest {                                          ─310
    public static void main(String args[]) {
        RealtimeThread rt = new RealtimeThread() {
            public void run() {                                       ─320
                AsyncEvent ae = new AsyncEvent();                     ─330
                ae.addHandler(new MyAsyncEventHandler());
                for(int i = 0; i < 50; i++) {                         ─340
                    ae.fire();
                    //do other work
                }
            }
        };
        rt.start();                                                   ─350
        try {                                                         ─360
            rt.join();
        } catch(Exception ex) {
        }
    }
}
```
300

```
class MyAsyncEventHandler extends AsyncEventHandler {
    public void handleAsyncEvent() {                                  ─380
        System.out.println("handler called");
    }
}
```
370

FIG. 4
400

410 — 17:14:24.838 0x81e7f00 ae.25 > Entry AsyncEvent.fire() thisObj=0x10241024 ⌐411

420 — 17:14:24.838 0x81e7f00 ae.26 < Exit AsyncEvent.fire()

430 — 17:14:24.838*0xe58a0700 ae.4 > Entry AsyncEventHandler.run() event=0x10241024, thisObj=0x600060 ⌐431

440 — handler called

450 — 17:14:24.838 0xe58a0700 ae.5 < Exit AsyncEventHandler.run()

```
510
<view name="Asynchronous-event-fire">
  <entry-events>
    <trace-event>
      <match>
        530  <compare type="string" matches="ae"> <component/> </compare>
             <compare type="number" matches="25"> <tpid/> </compare>
      </match>
      <key>
        540  <param atindex="0"/>
      </key>
      <info>
        550  <param atindex="0" type="hex-number" />
      </info>
    </trace-event>
  </entry-events>
  <exit-events>
    <trace-event>
      <match>
        570  <compare type="string" matches="ae"> <component/> </compare>
             <compare type="number" matches="5"> <tpid/> </compare>
      </match>
      <key>
        580  <param atindex="0"/>
      </key>
    </trace-event>
  </exit-events>
</view>
```

520 brackets entry-events section
560 brackets exit-events section

FIG. 13

1310  j9vm.1 2 1 1 1 N Trc_VM_CreateRAMClassFromROMClass_Entry " >Create RAM class from ROM class %p in class loader %p"

1320  j9vm.2 4 1 1 1 N Trc_VM_CreateRAMClassFromROMClass_Exit " <Created RAM class %p from ROM class %p"

1330  j9vm.80 0 1 1 N Trc_VM_CreateRAMClassFromROMClass_className "    ROM class %p is named %.*s"

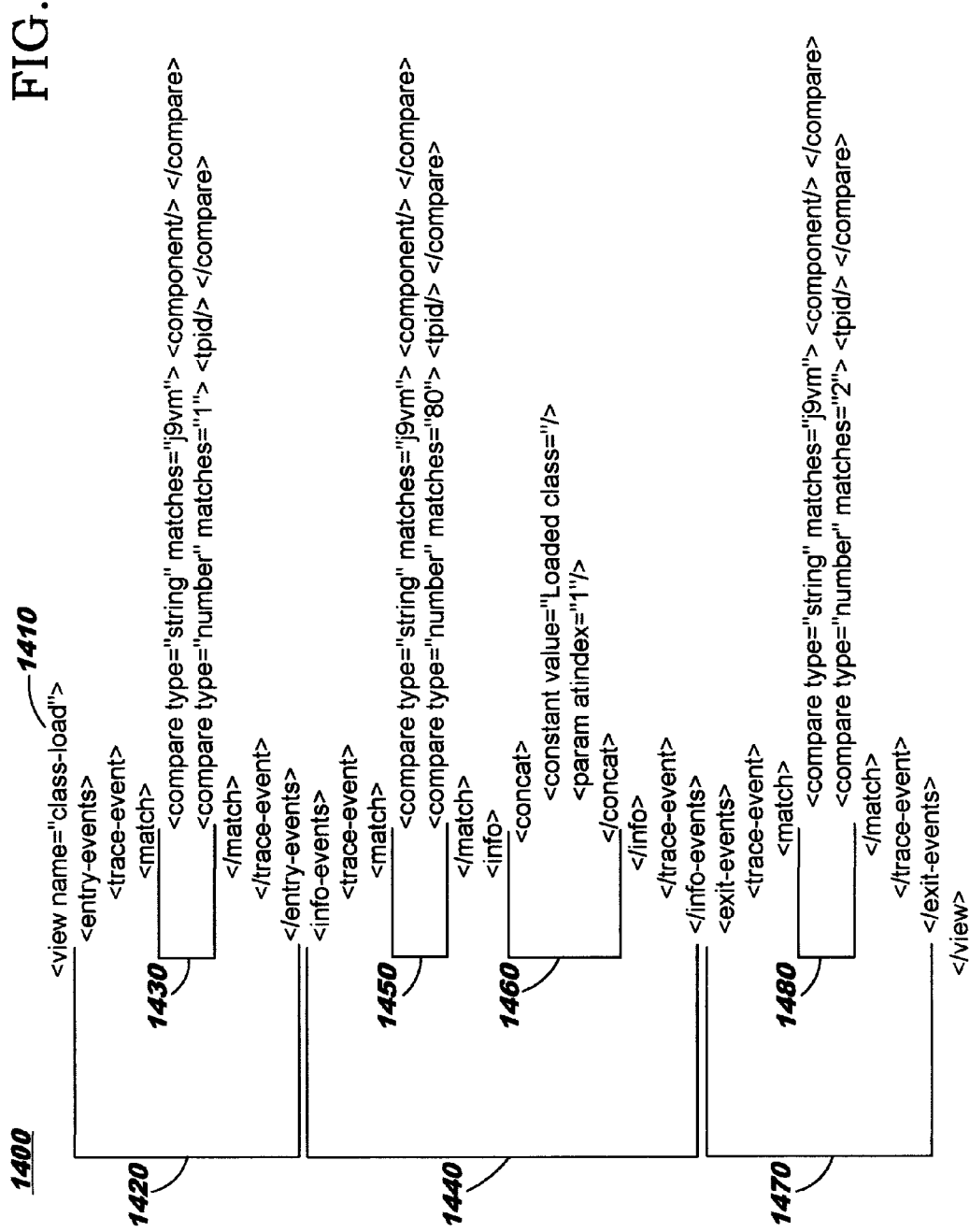

FIG. 15

1500 — mt.0 2 1 4 N Trc_MethodEntry " >%. *s. %. *s%. *s Bytecode method, This = %zx"

mt.1 2 1 4 N Trc_MethodEntryC " >%. *s. %. *s%. *s Compiled method, This = %zx"

mt.2 2 1 4 N Trc_MethodEntryN " >%. *s. %. *s%. *s Native method, This = %zx"

mt.3 2 1 4 N Trc_MethodEntryS " >%. *s. %. *s%. *s Bytecode static method"

mt.4 2 1 4 N Trc_MethodEntryCS " >%. *s. %. *s%. *s Compiled static method"

1510 — mt.5 2 1 4 N Trc_MethodEntryNS " >%. *s. %. *s%. *s Native static method"

1520 — mt.6 1 4 N Trc_MethodExit " <%. *s. %. *s%. *s Bytecode method"

mt.7 4 1 4 N Trc_MethodExitC " <%. *s. %. *s%. *s Compiled method"

mt.8 4 1 4 N Trc_MethodExitN " <%. *s. %. *s%. *s Native method"

mt.9 4 1 4 N Trc_MethodExitS " <%. *s. %. *s%. *s Bytecode static method"

mt.10 4 1 4 N Trc_MethodExitCS " <%. *s. %. *s%. *s Compiled static method"

1530 — mt.11 4 1 4 N Trc_MethodExitNS " <%. *s. %. *s%. *s Native static method"

1610 — <view name='"LinkedList add methods'">
        <entry-events>
          <trace-event>
            <match>
              <compare type="string" matches="mt"> <component/> </compare>
              <compare type="number" matches="0,1,2,3,5"> <tpid/> </compare>
              <compare type="regex" matches="java/util/LinkedList.add*">
                <concat>
                  <param atindex="0"/>
                  <constant type="string" value="."/>
                  <param atindex="1"/>
                </concat>
              </compare>
            </match>                                                    } 1630
            <info>
              <concat>
                <param atindex="0"/>
                <constant type="string" value="."/>
                <param atindex="1"/>
              </concat>                                                  } 1640
            </info>
          </trace-event>
        </entry-events>                                                  } 1620
        <exit-events>
          <trace-event>
            <match>
              <compare type="string" matches="mt"> <component/> </compare>
              <compare type="number" matches="6,7,8,9,10,11"> <tpid/> </compare>
            </match>                                                    } 1660
          </trace-event>
        </exit-events>                                                   } 1650
      </view>
```

```
<view>
    <composite display="overlap">    ←1710
        <view refers="reference to already registered view">   ←1730
            <color>blue</color>
        </view>
    </view>   ←1720
        <view refers="reference to already registered view">   ←1750
            <color>red</color>
        </view>
    </view>   ←1740
    </composite>
</view>
```

FIG. 19

```
public class TraceEvent {
    MatchBlock matchBlock; //match block in the xml view definition
    InfoBlock infoBlock; //info block in the xml view definition
    KeyBlock keyBlock; //key block in the xml view definition /**
     * Returns true if the trace event matches the match block definition
     */
    public boolean matches(TracePoint tp){
        return matchBlock.matches(tp);
    }

/**
     * Extracts the key from the trace event as per defined key block
     * returns thread id if no key is defined
     */
    public Object getKey(TracePoint tp){
        return keyBlock.getKey(tp);
    }

/**
     * Extracts the info from the trace event as per defined info block
     * returns null if no info block is found
     */
    public String getInfo(TracePoint tp){
        return infoBlock.getInfo(tp);
    }
}
```

FIG. 18

```
public class TracePoint {
    int type;
    long timestamp;
    long thread_id;
    int component;
    int tpid;
    Object params[];
}
```

FIG. 20

```
public class ViewDefinition {
    TraceEventList entry_events; //Loaded Entry event list
    TraceEventList info_events; //Loaded Info event list
    TraceEventList exit_events;//Loaded Exit event list
    EventMap eventMap; //Intermediate map used to hold the semiprocessed events
    EventList eventsToDisplay; //processed events to be displayed public void processIncomingTracePoint(TracePoint tp) {
        TraceEvent te = null;
        Object key = null;
        String info = null;
        Stack<EventData> stack = null;
        EventData eData = null;
        if((te = entry_events.getMatchingTraceEvent(tp))!=null) {
            //Incoming trace point matches one of entry events
            key = te.getKey(tp); //Extract the key
            info = te.getInfo(tp); //Extract the info
            //Obtain the stack entry for the given key
            stack = eventMap.getStack(key);
            if(stack == null) {
                stack = new Stack<EventData>();
                eventMap.putStack(key, stack);
            }
            //Create and push the EventData object
            eData = new EventData();
            //Set the required values into EventData object
            eData.setData(tp.getThreadId(), tp.getTime(), info);
```

FIG. 20 (cont'd)

```
    //Push the event data onto the stack
    stack.push(eData);
} else if ((te = info_events.getMatchingTraceEvent(tp))!=null) {
    //Incoming trace point matches one of info events
    key = te.getKey(tp);//Extract the key
    info = te.getInfo(tp);//Extract the info
    //Obtain the stack entry for the given key
    stack = eventMap.getStack(key);
    eData = stack.peek();
    //Set the info into the eventData
    eData.setInfo(info);
} else if ((te = exit_events.getMatchingTraceEvent(tp))!=null) {
    //Incoming trace point matches one of exit events
    key = te.getKey(tp);//Extract the key
    info = te.getInfo(tp);//Extract the info
    //Obtain the stack entry for the given key
    stack = eventMap.getStack(key);
    //Pop the entry from the stack
    eData = stack.pop();
    //Set the info into the eventData
    eData.setInfo(info);
    //Do final calculations
    eData.calculateTimeTaken(tp);
    //Add to the list of events to be displayed
    eventsToDisplay.add(eData);
}
}
```

CREATING DYNAMIC INTERACTIVE VIEWS FROM TRACE EVENTS FOR PERFORMING DETERMINISTIC PERFORMANCE ANALYSIS

BACKGROUND

The present invention relates to computing systems, and deals more particularly with performance analysis using computing systems. Still more particularly, the present invention relates to views for deterministic performance analysis, where the views are created from trace events.

Outliers, in the context of performance analysis of tasks, are particular instances of tasks whose execution time deviates relatively far from the mean execution time of the tasks. Outliers can cause various negative effects, based on the type of environment in which the task is executing. For example, an outlier representing a failure to meet a service level agreement in the run-time performance of a real-time application in a computing system can cause monetary loss for a service provider. As another example, an outlier may even represent a situation where physical safety of one or more persons is in jeopardy due to abnormal behavior of a task.

BRIEF SUMMARY

The present invention is directed to creating views for deterministic performance analysis from trace data. In one aspect, this comprises: specifying, in a view definition, how to match a trace record that corresponds to an entry point of a monitored operation; specifying, in the view definition, how to match a different trace record that corresponds to an exit point of the monitored operation; comparing a plurality of trace records to the specifications in the view definition to locate the trace record and the different trace record; and upon locating the trace record and the different trace record, using the located trace record and the located different trace record when generating a view that includes the monitored operation. The specifications in the view definition may be programmatically created, using parameter values selected by a user from a graphical user interface, and the graphical user interface may present allowable selections for the parameter values, the allowable selections determined programmatically by inspecting a set of trace point definitions, each of the trace point definitions defining what information will be written as a trace record when the trace point is encountered at run time. Preferably, the specification of how to match the trace record and the specification of how to match the different trace record each comprise a specification of a component identifier and a trace point identifier that must be present for the match to occur, where the trace point identifiers in these specification are different. One or both of the specifications may further comprise a specification of a thread identifier that must be present for the match to occur. At least one of the specifications may further comprise a specification of information to be extracted from the trace record or the different trace record, respectively, upon the locating thereof, and this extracted information may be used in a separate display (such as a hover pop-up) display that is displayed, in association with a display of the generated view, responsive to a user gesture (such as a hover action) performed by a user from the display of the generated view.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

FIG. 3 provides code illustrating an asynchronous execution scenario whereby two different threads are interacting within a component;

FIG. 4 provides an example of records that may be generated in a trace file when executing the code of FIG. 3;

FIG. 5 provides an example of a view definition that defines the scope of trace events that are to be represented in a particular view;

FIG. 13 illustrates several trace point definitions, which may be used (for example) when displaying a view for a predetermined set of trace points;

FIG. 14 provides a sample view definition representing the trace points as defined in FIG. 13;

FIG. 15 depicts a set of trace point definitions that may be used when performing a method trace;

FIG. 16 illustrates a sample view definition that may be used for a method trace, using several of the method trace point definitions shown in FIG. 15;

FIG. 17 shows an example of syntax which may be used to specify a composite view definition;

FIG. 18 shows a sample data structure format that corresponds to a TracePoint object;

FIG. 19 provides sample code for processing a trace event;

FIG. 20 provides sample code for processing a view definition to generate a view;

DETAILED DESCRIPTION

Figure 1:
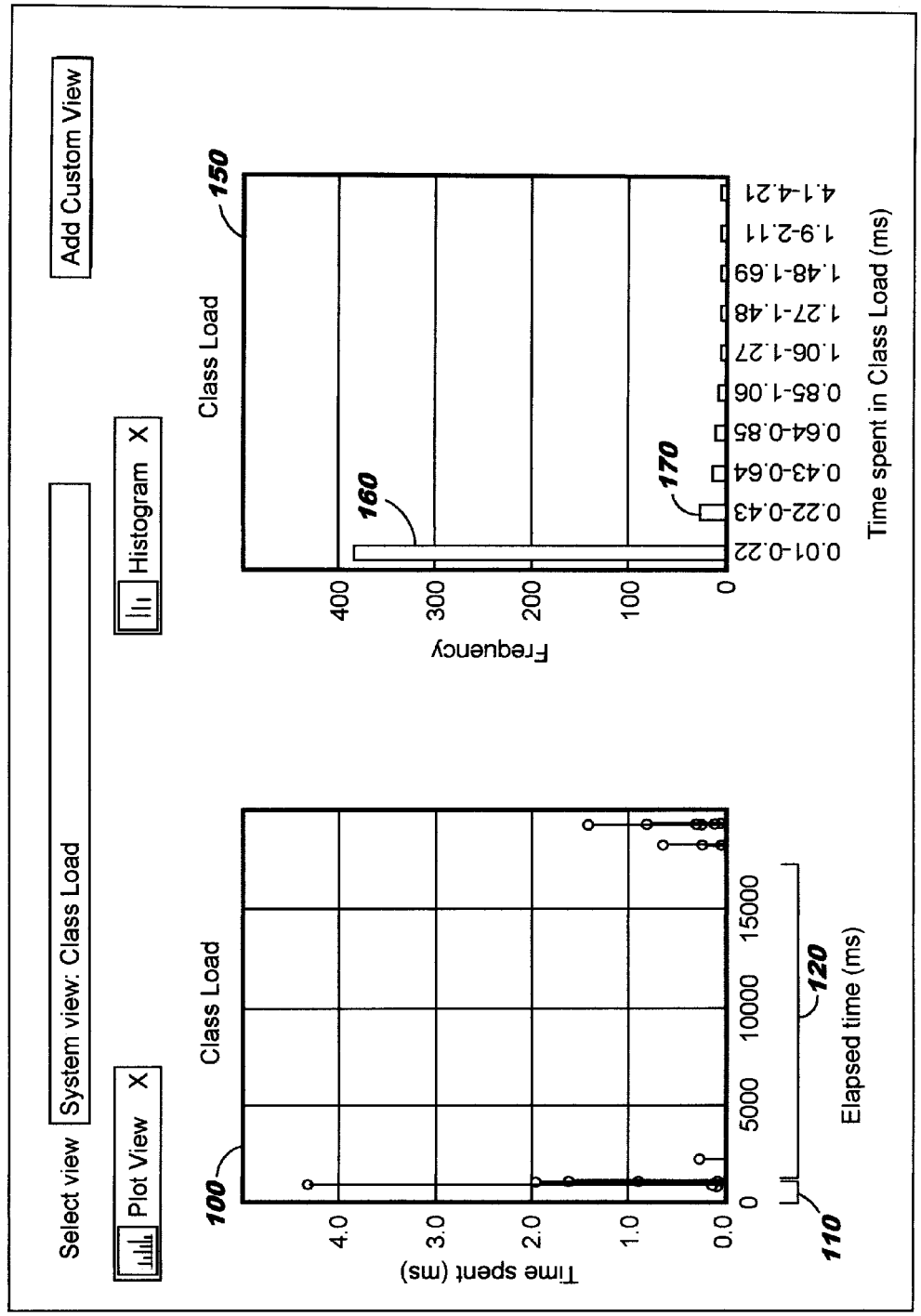
FIG. 1 depicts an example of a system view for a class loading scenario.

The present invention is directed to creating views for deterministic performance analysis in real-time computing systems. The views may be rectilinear views. "Rectilinear", as that term is used herein, refers to graphs which are shown using plotted straight lines or as histograms (e.g., bar charts). These views can then be used to analyze outliers that occur during run-time execution.

As noted earlier, an outlier for a particular task is an instance of the task where the execution time deviates relatively far from the mean execution time for the task. In the case of run-time performance in a computing system, there may be more than one cause for outliers in a particular scenario, and it can sometimes be difficult to identify the cause(s) of the outliers. (Hereinafter, the term "cause" is used for ease of reference, and includes scenarios where this is more than one underlying cause.) At the same time, the increasing prevalence of real-time applications makes identifying outliers and their cause increasingly important.

It is observed that typical causes of outliers for task execution time in applications that are written in modern programming languages may include (by way of illustration but not of limitation) garbage collection cycles, just-in-time compilation, run-time class loading, lock contention, and/or thread preemption. For example, if a task is executing at a time when a garbage collection cycle is also being performed, the execution time of the task may be increased rather significantly due to resource contention with the concurrently-execution garbage collection code. As another example, the first instance of a task that performs run-time class loading may require significantly more execution time than a subsequent instance of that task because the subsequent instance may be able to use previously-loaded class instances.

To investigate what is happening during execution of a real-time application, it is desirable to show various run-time information. A plug-in that creates a graphical representation of various run-time information may be connected to an application that is being monitored. This plug-in may operate to create a graphical representation of various events that occur in a particular component of the application, where the graphical representation is also termed a "view" and allows the user to view run-time information for the component in such a way that the user is able to look for outliers. Furthermore, a capability may be provided whereby the user can analyze underlying data to investigate the cause of one or more outliers. The events that are used for creating the graphical representation may be obtained from trace data that is emitted by the application as it executes.

Multiple views may be provided using information obtained from trace data. Such views include, by way of example, performance analysis in the presence of garbage collection cycles, class loading events, and just-in-time compilation events. These views may be built into a system, so that they are always available for user selection, and may be termed "system views". A capability may also be provided whereby users can create custom views dynamically at run-time, such that execution data of interest to the user can be visualized directly while a monitored application continues to execute even though a system view for that execution data has not been provided. Custom views might be based on (by way of example) tracing execution of particular methods which are of interest to the user, or tracing execution using so-called "trace points" that capture run-time information whenever the execution path through the application reaches an enabled trace point.

For example, suppose tracing has been enabled for components A and B of an application, with trace points set at entry and exit of each of these components. Trace data will then be generated as components A and B are executed, and in particular, trace data will be generated when the code of these components is entered and exited at run-time. This trace data (which may also be referred to as "trace events" or "trace records") will typically be written to a trace log (which is sometimes referred to as a "trace file" or simply as a "trace"). Various calculations may be performed using the trace data. As an example, an amount of time that elapses while a particular thread is executing within the code of a component may be determined by subtracting the time at which the thread entered the component from the time at which the thread exited the component. The elapsed time may be impacted to varying degrees by a concurrently-executing garbage collection process, run-time class loading, and so forth, as noted earlier. Accordingly, it may be instructive for the user to look for outliers based on such trace data calculations.

In some scenarios, it is difficult to determine which records within a trace file are related. This leads to difficulty in accurately calculating various run-time information such as elapsed execution time within a monitored operation. While an operation typically has a single entry point, for example, there may be numerous exit points. One thread might exit an operation by successfully reaching an end point in an execution path, for example, while another thread might exit that same operation after reaching some type of error-detection point. Failure to set trace points at all potential exit points will therefore prevent capturing the needed trace data for some scenarios. And, for the trace data that is captured, it becomes necessary to identify trace data that is generated at each exit point of a monitored operation.

An example of a system view for a class loading scenario is shown in FIG. 1. In this example, a first view 100 is shown as a rectilinear plot view and a second view 150 is shown as a histogram. The x-axis in view 100 represents elapsed time, in milliseconds, and the y-axis represents time spent executing, also in milliseconds. Thus, it can be seen that much more time is spent executing during the initial portion 110 of the elapsed time as compared to an interim portion 120 of the elapsed time. The x-axis in view 150 represents time spent executing (i.e., class loading, in this example), in milliseconds, and the y-axis represents frequency. Thus, it can be seen that the interval 160 corresponding to 0.01 to 0.22 milliseconds of execution time occurs much more frequently than the interval 170 that corresponds to 0.22 to 0.43 milliseconds of execution time. The initial portion 110 of view 100 and the interval 160 of view 150 may therefore be considered as outliers, and a user may wish to investigate the underlying cause of these outliers. In the class loading scenario, for example, the user might determine that run-time class loading is having an adverse effect on the performance of an application, and might therefore take action to ensure that all needed classes are preloaded. (Techniques are known by which a list of classes can be provided to a run-time environment for the purpose of preloading the classes, for example.)

Preferably, information in a view represents the entry and exit time of an event which is being depicted. With reference to view 150, for example, the difference between the entry and exit time determines which of the bars 160, 170, . . . will be used to represent the event. With reference to view 100, by contrast, the difference between the entry and exit time determines the height (i.e., on the y-axis) of the plotted lines.

Figure 2:
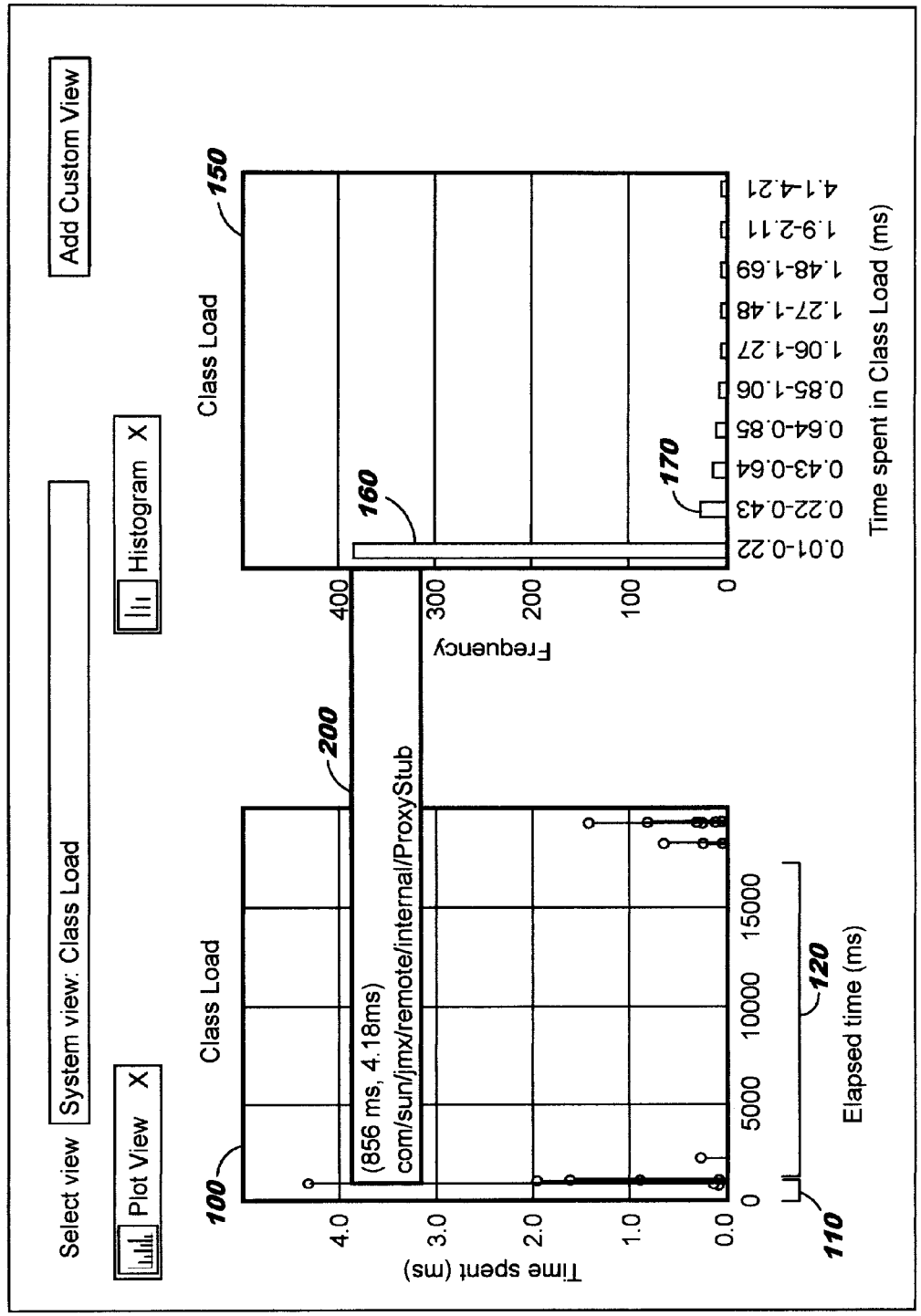
FIG. 2 shows how a hover pop-up display may be displayed for the user of the system view of FIG. 1, responsive to a request of the user.

The views also preferably provide a hover feature, whereby additional information will be automatically displayed responsive to the user hovering a selection means—such as the cursor of a mouse, or a light pen—over a portion of the view. In the class loading scenario, for example, the response to a hover over a plotted line in view 100 preferably comprises a pop-up display showing the name of a class that is being loaded. See FIG. 2, where view 100 has been updated to show a pop-up display 200 indicating that a "ProxyStub" method was being loaded at the selected time, and further indicating that the time spent executing this method was 4.18 milliseconds at elapsed time 856 milliseconds. Other types of information may be provided in a pop-up display as well. When a view pertains to a garbage collection cycle, for example, the underlying trace data may contain an ordinal number that corresponds to a count of the number of such cycles that have been performed—the number 10 indicating that this trace data is from the tenth garbage collection cycle, for example. Rather than simply displaying the ordinal number in the hover pop-up, an embodiment of the present invention preferably provides additional explanatory text, and might therefore display the phrase "GC cycle 10".

In the general case, an embodiment of the present invention presumes that the trace data emitted by a trace point comprises a component identifier ("component ID"), a trace point identifier ("trace point ID") that is unique within the component, an array of parameters representing data being operated upon by the component as well as one or more return values from the component, the time at which the trace event was generated, and the identifier of the thread ("thread ID") for which the trace data was generated (e.g., the thread whose entry or exit is represented by the trace data). This information, or a subset thereof, is then used when generating a view. (It may also happen that a subset of the above-listed information is emitted by a particular trace point.) The component ID might be of the form "cl", "mt", "j9vm", and so forth, and the trace point identifier may then indicate which operation is being performed in that component.

Creating a view for a given operation may comprise finding two related trace events, where these trace events are generated by the trace points for the entry into and exit from the operation. Code could be written to generate a view based on these particular trace point IDs upon detecting the corresponding trace events being written into the trace file. For example, as soon as the code detects a trace event containing the trace point ID of the entry point, the thread ID and entry time could be written to a data structure that uses the thread ID as a key and the entry time as the corresponding data value for that key. When the code subsequently detects a trace event containing the trace point ID of the exit point, the thread ID from that trace event could be used to search the data structure for the record with the matching key. Upon finding this record, the previously-stored entry time could then be extracted and used in combination with the exit time from the trace event corresponding to that thread's exit event to compute the elapsed time for the thread (that is, how long this thread spent executing in the corresponding component). This computed information could then be used in a rectilinear view (and one or more parameters from the array could used for providing additional information in a hover pop-up display).

However, this approach has some practical difficulties. As one example, there may be multiple exit points from the execution path of a particular component, as discussed above. Accordingly, writing code that searches for a particular trace point ID may not capture all of the exits from the component. If this happens and the thread subsequently re-enters the same component, the data structure will generally contain more entry records than exit records, even if a traced exit point is encountered on the subsequent execution, making it difficult to correctly determine which entry time goes with which exit time.

As another difficulty, providing meaningful data in a hover pop-up display may require obtaining information from additional trace points, not just from the entry and exit trace events. As yet another difficulty, there may be interaction among multiple threads for a given operation, and it may be desirable for the view to represent trace data collected for these multiple threads. As an example of this latter situation, a thread T1 might enter a monitored operation and then fire an asynchronous event that will be processed by an event handler that executes using a thread T2, and it may be desirable to represent the execution of both threads T1 and T2, as a logical unit, in the view.

A further difficulty with using code that searches for particular trace point IDs is that this code is very narrow in scope, and requires modification (or creation of new code) when it is desirable to monitor execution at a different point. A considerable amount of effort may therefore be required as a user creates code to generate views in an attempt to isolate the cause of an outlier.

Accordingly, an embodiment of the present invention uses code that is dynamically updatable, at run time, to generate a graphical view using trace points which the user specifies for the view, without requiring the user to manually create view-generation code. Using one embodiment, the user can then request display of a view that is based on a set of predefined trace points, or a view that is based on a method trace, or a composite view that is created from two or more views. Further details are provided, below, explaining how such views may be created, including the processing that collects and correlates the trace data for the view.

Referring now to FIG. 3, the code illustrated therein is an example of the above-noted asynchronous execution scenario whereby two different threads are interacting within a component, and more particularly, represents firing events which are then processed by an asynchronous event handling mechanism. As can be seen by inspection, an instance of the "AsynEventTest" class 300 creates a new real-time thread (in the variable named "rt"; see 310) and a new asynchronous event object (in the variable named "ae"; see 320) and assigns an event handler thereto (see 330). An instance of this class 300 then performs a loop 50 times, where this loop fires an asynchronous event on the asynchronous event object and then does other work (see 340). An instance of class 300 then starts the real-time thread (see 350) and calls a join method on that thread (see 360). Using the above-discussed example of interacting threads, the thread that is executing the instance of class 300 has thread ID T1, and the thread named "rt" has thread ID T2. As is understood by those of ordinary skill in the art, the join method causes its invoking thread to suspend, or wait, until the invoked thread completes its execution. Thus, thread T1 will wait until thread T2 completes, which corresponds to processing an asynchronous event in this example. Thread T2 will detect an asynchronously-fired event (as fired by the code at 340), and will process that event using the event handler code 370. In the example of FIG. 3, this event handling code 370 comprises printing the text "handler called" to system out (see 380).

FIG. 4 provides an example of records that may be generated in a trace file when executing the code of FIG. 3. This example comprises a total of 5 records 410-450 (which represent the processing of a single asynchronous event). Record 410 corresponds to entry into the AsyncEvent's fire method (see the notation ">Entry AsyncEvent.fire( )") and record 420 corresponds to exit from this fire method (see the notation "<Exit AsyncEvent.fire( )"). Record 430 corresponds to entry into the AsyncEventHandler's run method (see the notation ">Entry AsyncEventHandler.run( )") and record 450 corresponds to exit from this run method (see the notation "<Exit AsyncEventHandler.run( )"). The remaining record 440 is generated as the asynchronous event handler executes, and corresponds to the code at 380 of FIG. 3.

As can be seen from this sample data 400, the threads which execute the fire( ) and run( ) methods are two different threads, as shown by the differing values of variable "thisObject" at 411 and 431, respectively. Even though the fire method has completed before the run method, as shown by record 420 preceding records 430-450, it may be desired that the actual elapsed time associated with thread ID T1 for this example includes the execution by thread T2. That is, it may be desired to consider the execution of the fire operation as being logically complete only when the asynchronous processing of one of the fired events is also complete, where it cannot generally be known in advance which of the 50 fired events will be the first to complete (and note that FIG. 4 represents processing of only the first of the 50 asynchronous events fired by the example code at 340). In an alternative approach, it may be desired to consider the execution of the fire operation as being logically complete when all of the 50 fired events have completed.

Thus, it can be seen from the example in FIGS. 3 and 4 that view-generating code based on associating entry and exit points for a single thread does not suffice to represent a complete picture of the run-time performance of interacting threads. An embodiment of the present invention therefore enables using a metadata approach when defining the scope of trace events that are to be represented in a particular view. An example of such view definition is provided in FIG. 5, as will now be discussed.

Markup language syntax is used for creating the view definition 500 of FIG. 5. The Extensible Markup Language, or "XML", is an example of a markup language that may be used for this purpose. (It should be noted that the particular syntax used in the examples herein is by way of illustration but not of limitation, and changes may be made to this syntax without deviating from the scope of the present invention.) A name is assigned for the defined view, and in this example, is set to "Asynchronous-event-fire"; see 510. A definition section 520 is provided to define trace entry point events of interest for this view, and another definition section 560 defines trace exit point events of interest. (Refer also to the discussion of FIG. 11, below, for more information about the syntax used within sections 520 and 560.)

For the example view definition 500, the entry point definition section 520 comprises specifying that a matching trace record is one in which a component ID has the value "ae" and a trace point ID has the value "25" (denoting a particular entry point, in this example). See 530. Entry point definition section 520 further specifies that a key of the trace point—which is the thread ID, in the example—is found at index 0 within the array of parameters in the trace record. See 540, where this is specified. Finally, entry point definition section 520 specifies that the value found at index 0 in the array of parameters, which is of type hexadecimal number, is to be retrieved from a matching trace record; see 550.

The exit point definition section 560 in the example view definition 500 comprises specifying that a matching trace record is also one in which the component ID has the value "ae" and the trace point ID has the value "5" (denoting a particular exit point, in this example). See 570. Exit point definition section 560 further specifies that a key of the trace point—which again is the thread ID—is found at index 0 within the array of parameters in the trace record. See 580, where this is specified.

The view definitions which are used by an embodiment of the present invention may be created dynamically, at run time, as the user decides which operations to focus on during performance analysis. Preferably, a graphical user interface ("GUI") is provided for prompting the user to enter parameters that are then programmatically inserted into a view definition of the form discussed herein (as illustrated, for example, by view definition 500 of FIG. 5 and so forth), responsive to the user activating a selectable link (such as a graphical button) on a display. A sample GUI that may be presented to the user for this parameter entry is shown at 600 of FIG. 6, and a process for using such view definitions for analyzing outliers is then discussed with reference to FIG. 7.

Figure 6:
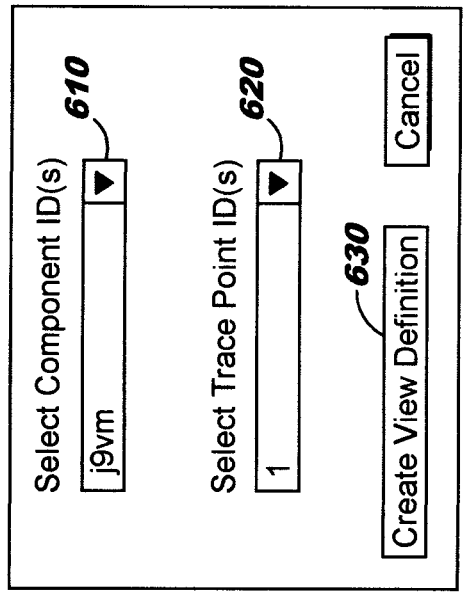
FIG. 6 illustrates a sample GUI that may be presented to the user for prompting the user to enter parameters for customizing a view definition.

Referring first to FIG. 6, a collection of component IDs is preferably gathered and used to populate a drop-down list 610, from which the user can select which component ID is of interest for a customized view definition. The list of component IDs to present to the user is preferably determined by consulting the trace point definitions which are in effect, and extracting the component ID from each such definition. The format of a trace point definition is discussed below with reference to FIG. 8. A component ID of "mt" is preferably added to the list 610 in all cases, where "mt" is a type of reserved symbol indicating "method trace" that enables the user to request creating a view definition that corresponds to tracing a method. A collection of trace point IDs is preferably gathered and used to populate another drop-down list 620, from which the user can select which trace point ID is of interest for the customized view definition. The collection of trace point IDs to present in list 620 may be determined responsive to the user's selection of component ID at 610, and preferably comprises presenting only those choices which are found in trace point definitions for the component selected at 610. When the "mt" component ID is selected at 610, an additional entry (not shown in FIG. 6) is preferably provided for the user to specify the method name(s) of interest. A populated list may be presented, and/or the user may be allowed to type a text string into an entry box. Regular expression syntax may also be supported, thereby allowing the user to request use of multiple method names. (Regular expression syntax is discussed in further detail below, with reference to FIGS. 11 and 15-16.) A predetermined list of trace point IDs may be inserted into the drop-down list 620 when the component is selected as "mt". See FIGS. 15-16, below, which discuss these values.

Note that the GUI used by an embodiment of the present invention for user entry of parameters for view creation may be adapted for allowing the user to enter multiple component IDs and/or multiple trace point IDs. The GUI may also be adapted for allowing the user to enter other information that is to be programmatically inserted into a view definition, although for ease of illustration, this has not been shown in FIG. 6. (It will be obvious to those of ordinary skill in the art, in view of the disclosure herein, how the example GUI 600 can be extended and/or changed to request additional and/or different information from the user.) GUI 600 also depicts a graphical button 630 that can be activated by the user when parameters for creating the customized view have been entered, thereby causing a new view definition file to be created and populated with the entered parameters. The new view definition file is then preferably added to a common view definitions file (which is discussed in further detail below). In addition, an embodiment of the present invention preferably uses the newly-created customized view definition to dynamically create a corresponding view and display the view for the user, if the system is currently executing a real-time application. Alternatively, the user may create customized view definitions using the approach depicted in FIG. 6 in an offline mode—that is, separate from the execution of the real-time application—and in that case, the view definition is preferably added to the common view definitions file but not yet used to create a view.

Figure 7:
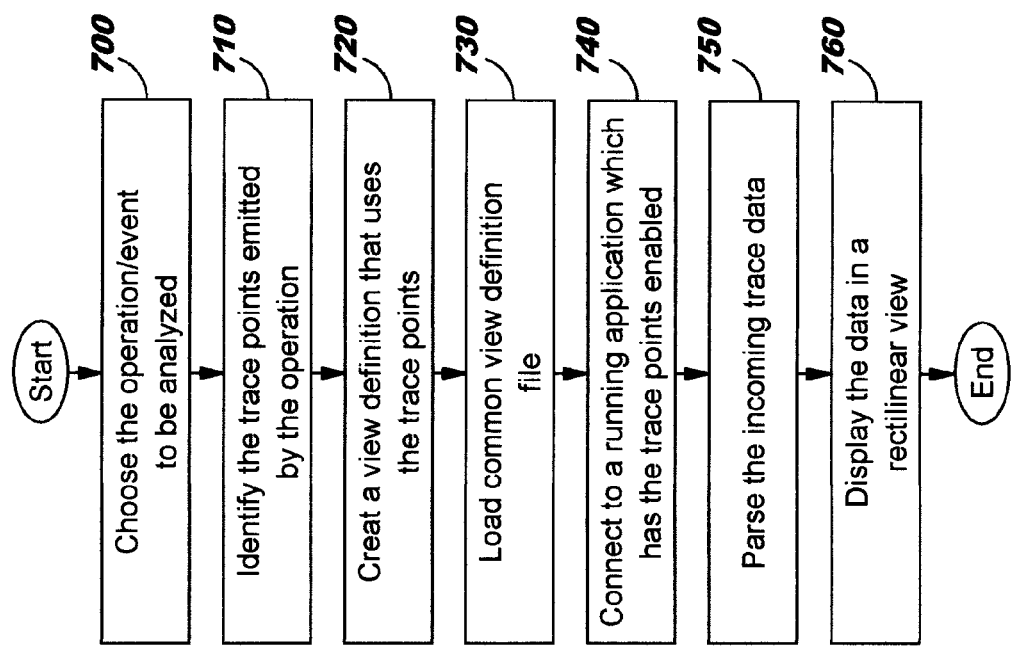
FIG. 7 provides a flowchart illustrating logic which may be used when implementing an embodiment of the present invention.

Referring now to FIG. 7, a flowchart is provided that depicts stages involved in analyzing outliers when using an embodiment of the present invention. Initially, a user chooses one or more operations and/or events that are to be analyzed (Block 700), which preferably comprises determining which component IDs will be written into the trace as each operation/event of interest is executed. The relevant trace points of each such operation/event are identified (Block 710), which preferably comprises determining what trace point ID will be written into the trace from each of the trace points. A view definition is then created that uses these trace points (Block 720). See, for example, the component ID "ae" and trace point IDs 25, 5 which are specified at 530 and 570 in the view definition 500 of FIG. 5.

Each view that is defined in this manner is preferably stored in a common view definitions file, which is preferably loaded when the system to be monitored is initially started (Block 730). This loading preferably comprises registering the name of each defined view, such that the view can subsequently be invoked. Optionally, additional view definitions can be added dynamically to the view definition file at run time (not separately shown in FIG. 7), as discussed above with reference to FIG. 6. An embodiment of the present invention is connected to a running application that has trace points enabled (Block 740), and commences to parse incoming trace data (Block 750). (Note that an embodiment of the present invention may alternatively be used to process trace data that has already been collected, and thus connection to a currently-running application is not strictly required.) One or more rectilinear views can then be displayed (Block 760).

Figure 8:
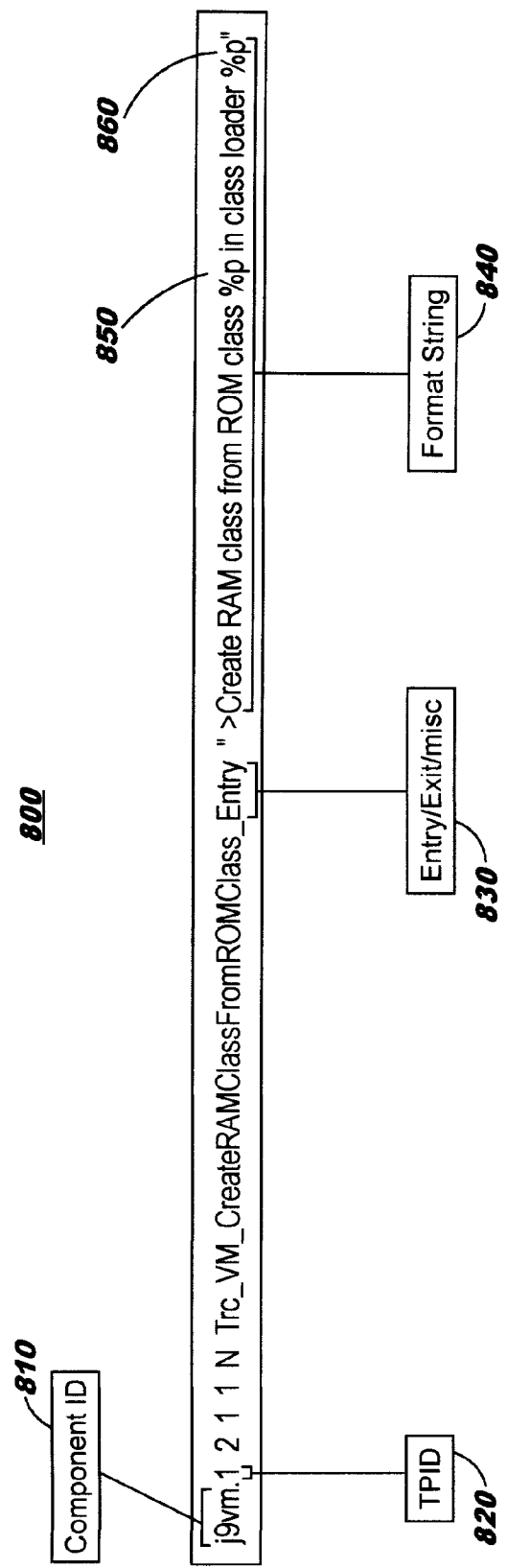
FIG. 8 illustrates a format of a sample trace point definition.

When used in a computing environment that executes a Java® virtual machine, each important operation that executes has built-in facilities for logging what it is doing, and each instance of this logging may be considered as a trace point. ("Java" is a registered trademark of Oracle Corporation in the United States, other countries, or both.) Trace points can be enabled or disabled, based on requirements of a particular environment. And while trace points are normally established at the entry point of a component of interest and at one or more exit points of the component, additional trace points may be established at other locations within the executable code (for example, to provide further context about the run-time operation of the component). In the case of a computing environment that uses a Java virtual machine, the built-in logging facilities typically generate their trace data using a component ID, trace point ID, an array of parameters, the time at which the trace event was generated, and the thread ID, as discussed earlier. A trace point definition may specify that any or all of these values is logged to the trace. In addition, a trace definition may include a character string message, and this message may contain placeholders for additional operation-related data. FIG. 8 shows a sample trace point definition 800, as will now be described.

Trace point definition 800 specifies a component ID 810, which in this example has the value "j9vm", and a thread ID 820, which has value "1". The syntax at 830 indicates, in this example, that this trace point corresponds to Entry into the component, and the syntax at 840 provides for writing a text string to the trace when this trace point is encountered at run time. Notably, this text string syntax 840 contains two placeholders 850, 860, where placeholders are generally denoted by the presence of a "%" (percent) symbol. In this example, the "% p" syntax denotes that a value from the parameter array is to be slotted into the text string (i.e., to replace the placeholder) as the text string is written to the trace.

Figure 9:
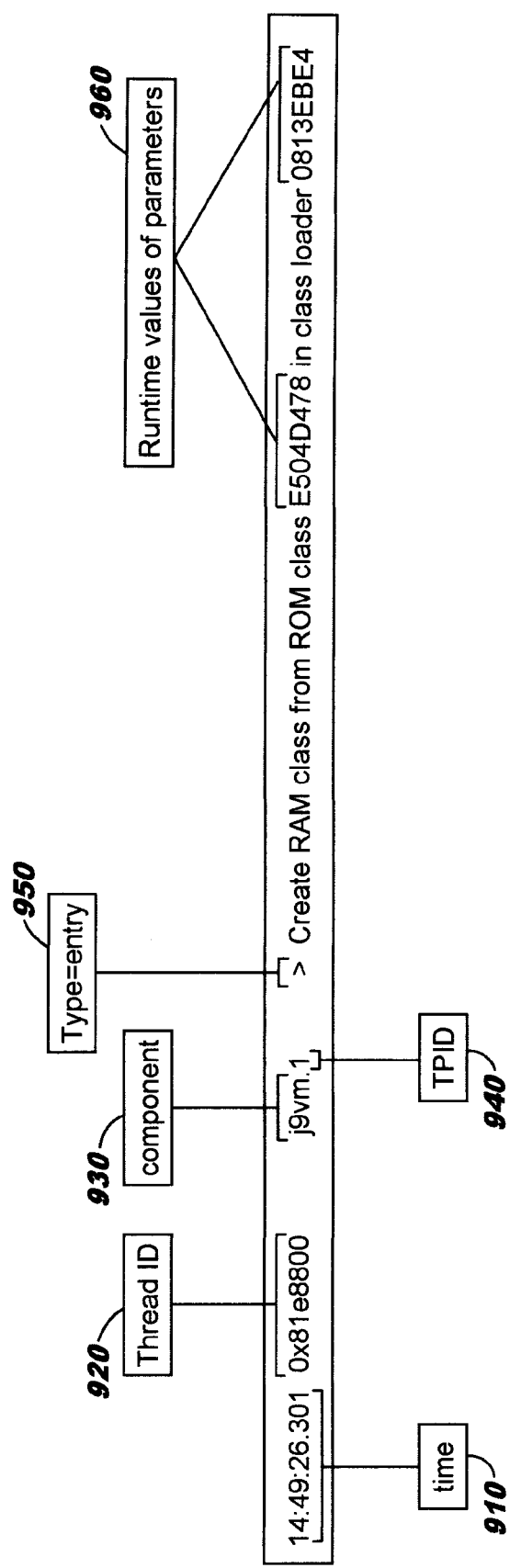
FIG. 9 presents an example of a trace record that corresponds to the trace point definition in FIG. 8.

See FIG. 9, which presents an example of a trace record 900 that corresponds to the trace point definition 800. The time at which the trace point was executed is recorded at 910, and the hexadecimal thread ID of the thread that encountered the trace point is recorded at 920. The component ID and trace point ID are recorded at 930, 940, respectively (and correspond to the values specified at 810, 820 of definition 800). A ">" character is recorded at 950 to denote that this trace record is from an entry point (and a "<" character is used in trace records to denote an exit point). Run-time parameter values have been recorded in place of the placeholders, as shown at 960. Refer also to FIG. 4, above, which provides several additional examples of trace records.

In addition to the built-in logging facilities that are supported by the Java virtual machine for various operations, the virtual machine also has the ability to produce trace data for each Java method that is executed within the virtual machine. Such traces are called method traces. It may be desired to view a method trace from the execution of a particular method to see how a particular business operation is performing, for example, where it is known that the business operation uses that method. An embodiment of the present invention also allows for a wildcard-type approach, whereby a view can be created from the method trace of multiple methods (as discussed in more detail below with reference to the example in FIGS. 15-16.) The format of a trace record generated by a method trace is very similar to the trace records discussed above with reference to FIGS. 8 and 9, and an example is illustrated in FIG. 10, as will now be discussed.

Figure 10:
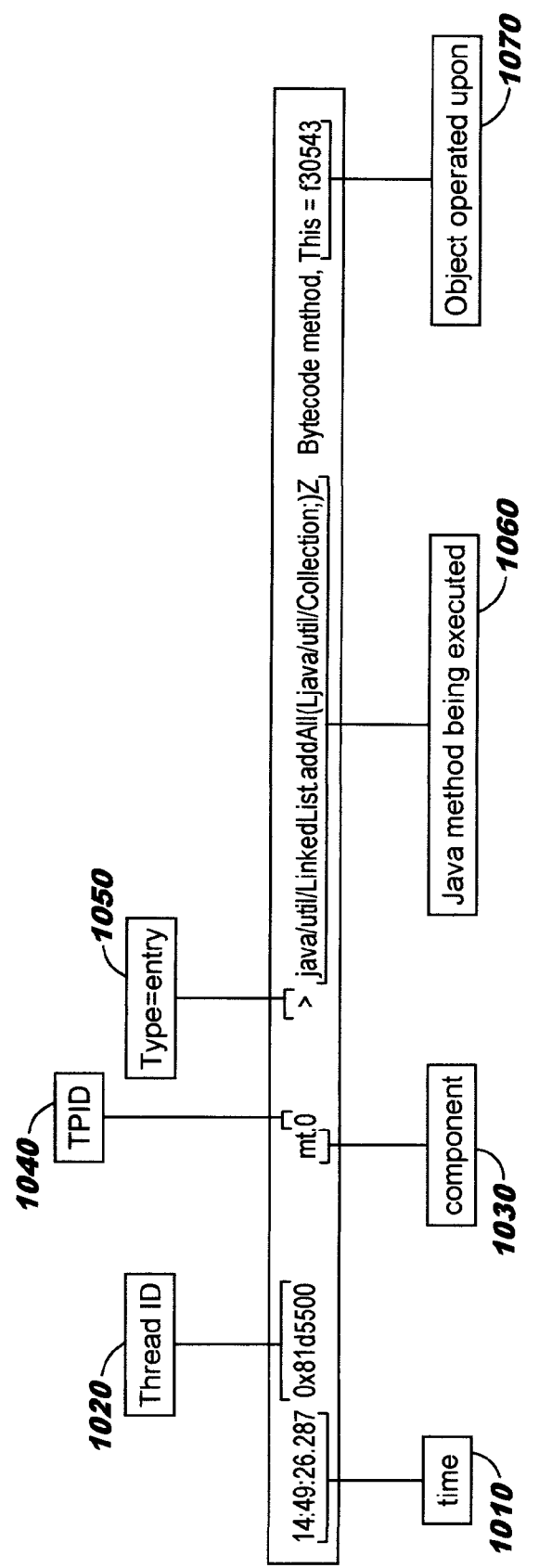
FIG. 10 presents an example of a format of a trace record generated by a sample method trace.

Trace record 1000 of FIG. 10 includes the time 1010 at which the trace point was executed, and the hexadecimal thread ID 1020 of the thread that encountered the trace point. The component ID 1030 and trace point ID 1040 are also recorded (and have values "mt" and "0", respectively, in this example), as well as a character that denotes whether this trace record is from method entry or method exit. Accordingly, the ">" character is shown at 1050 to denote that this trace record is from entry into the "mt" component (which is a reserved component ID that indicates a method, as noted earlier). An identifier of the method being executed is recorded, as shown at 1060. A unique identifier of the object which is being operated upon is also recorded, as shown at 1070. Refer also to FIG. 4, above, which provides several additional examples of trace records.

Figure 11:
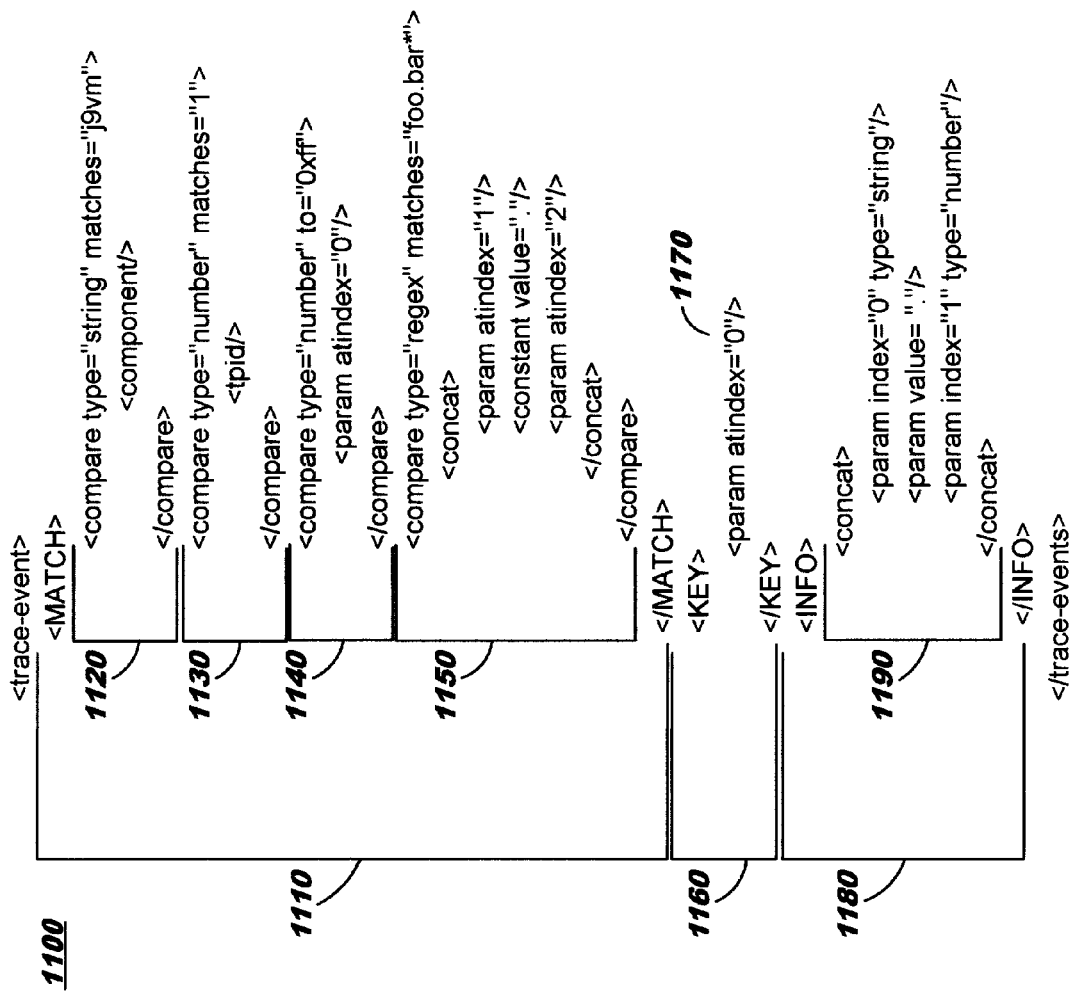
FIG. 11 shows a sample markup language representation for a trace event definition syntax.

FIG. 11 shows a sample markup language representation for a trace event definition syntax. This syntax 1100 may be used for defining which trace entry point events and trace exit point events are of interest for a particular view, as noted briefly above with reference to FIG. 5. In the general case, 3 sections 1110, 1160, 1180 are specified (although as shown in FIG. 5, one or more sections may be omitted in some instances), and these will now be discussed.

The match section 1110 contains syntax that defines what constitutes a match when analyzing a trace record. If a trace record does not match, according to the definition in the match section, then the trace record does not need to be considered for the current view. One or more compare elements (i.e., having syntax "<compare . . . > . . . </compare>") are specified, and in preferred embodiments, the corresponding comparisons are performed in sequence according to the order specified in the match section 1110. Comparisons may be specified as numeric, constant string, or regular expression compares. Operations such as concatenation may be specified, in order to perform a comparison against a combination of parameter values that are extracted from trace records.

In the example shown in FIG. 11, the compare elements specify values that must be present in the component ID, trace point ID, and parameter array in order for an analyzed trace record to match this definition 1100. See 1120, where the component ID is specified as matching the value "j9vm", and 1130, where the trace point ID is specified as matching the value "1". The compare element at 1140 indicates that the parameter value at index 0 (i.e., the first parameter value) in the parameter array can be any hexadecimal number, up to and including the value "0xff". The compare element at 1150 indicates that a regular expression matching is performed with reference to the string "foo.bar*", where this string will be matched against a concatenation of the following: (i) the parameter value at index 1 in the parameter array; (ii) the "." character; and (iii) the parameter value at index 2 in the parameter array.

The key section 1160 is generally optional, but may be required in some cases in order to correctly construct a particular view. In the general case, key section 1160 specifies what value is to be used as an index for correlating related records in the trace, and in the example of FIG. 11, the parameter value at index 0—which is the thread ID—is to be used as the key, as shown at 1170. Notably, however, trace records may be written into the trace in an unpredictable sequence in a multi-threaded application. Therefore, using the thread ID is not always sufficient for correlating related records in the trace. In an asynchronous operation mode (which was discussed above with reference to the examples in FIGS. 3-4), for example, the thread which triggers an operation may not be the one that actually performs the operation, and hence the entry and exit of the operation may be performed by two different threads. Accordingly, to account for scenarios where it is not sufficient to use only the thread ID to correlate which trace records are related, the key section 1160 can be used to specify additional values—which may be, for example, one or more additional parameter values from the parameter array.

The info section 1180 specifies what information is to be extracted from a matched trace record. This extracted information may then be used, for example, when constructing a hover pop-up display. In the example in FIG. 11, the syntax at 1190 indicates that what should be displayed is a concatenation of: (i) the parameter value at index 1 in the parameter array, represented as a string; (ii) the "." character, which is a constant; and (iii) the parameter value at index 2 in the parameter array, represented as a string.

As noted earlier, an embodiment of the present invention uses code that is dynamically updatable, at run time, to generate a graphical view that is based on a set of predefined trace points, a view that is based on a particular method definition, or a composite view that is created from two or more views. Further details will now be provided with reference to each of these choices.

Figure 12:
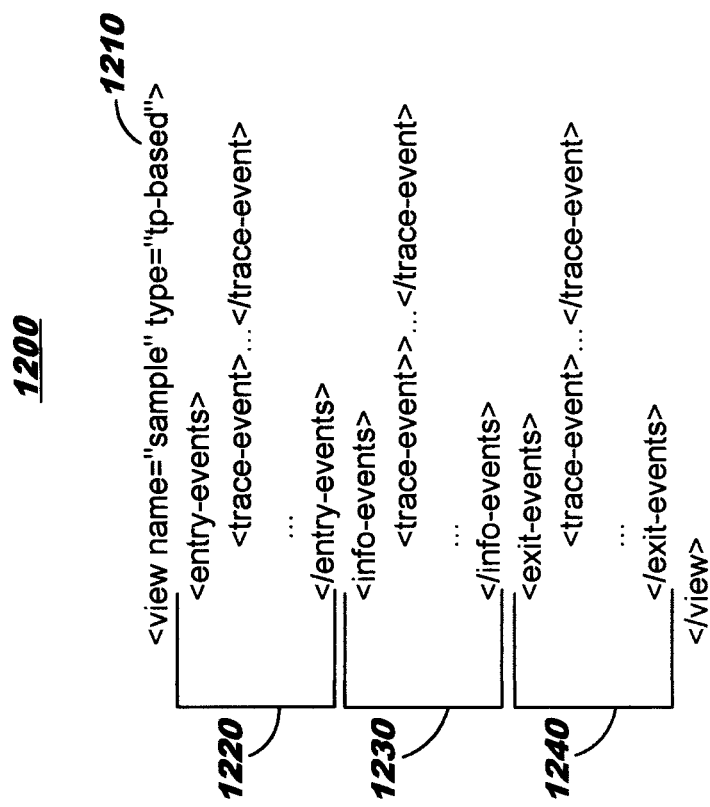
FIG. 12 illustrates a generic view definition, using markup language syntax.

Referring first to generating a graphical view for a set of predefined trace points, a generic view definition 1200 is provided in FIG. 12 using markup language syntax. A view definition preferably comprises a name and type for the defined view, as shown at 1210. In this example, the value of the "type" parameter is set to "tp-based", indicating that the view is based on trace points. The view definition may also comprise an entry events section 1220 to define trace entry point events of interest for this view, an information events section 1230 to define informational trace events of interest for this view, and an exit events section 1240 to define trace exit point events of interest. (Refer also to the discussion of FIG. 5, above, where a sample view definition was provided using sections that correspond to 1220 and 1240.)

In the general case, the <entry-events> block 1220 should include one or more trace-event definitions which denote the start of an operation that is being monitored, and the <exit-events> block 1240 should include one or more trace-event definitions which denote the end of the operation. (See the discussion of the <trace-event> element that is provided above with reference to FIG. 11.) And, the <info-events> block 1230 should include zero or more trace-event definitions which can provide some meaningful information about the monitored operation. (Block 1230 may be omitted when there are no trace-event definitions to specify therein, as in the example of FIG. 5.)

As an example of displaying a view for a predefined set of trace points, consider a sample class-loading view definition which is based on 3 predefined trace points, where the corresponding trace point definitions are shown at 1310-1330 in FIG. 13. In this example, definition 1310 represents an entry trace event, definition 1320 represents an exit trace event, and definition 1330 represents an informational trace event. Use of ">" and "<" characters to denote entry and exit trace points, respectively, has been discussed above. Note that the informational trace event definition 1330 contains neither of these characters. It will also be noted that each of the definitions 1310-1330 contains 2 occurrences of the placeholder notation "%". A class-loading view definition representing the 3 predefined trace points of FIG. 13 is shown in FIG. 14, as will now be discussed.

The sample class-loading view definition 1400 assigns a name of "class-load" to the defined view. See 1410. The entry events definition 1420 indicates that a matching trace record is one in which the component ID has the value "j9vm" and the trace point ID has the value "1" (see 1430). The informational events definition 1440 indicates that another matching trace record has the value "j9vm" for the component ID and the value "80" for the trace point ID (see 1450), and that when such a record is located in the trace, the parameter value having index "1" is to be extracted and concatenated to the string "Loaded class=" (see 1460). Finally, the exit events definition 1470 indicates that a matching trace record is also found when the component ID has the value "j9vm" and the trace point ID has the value "2" (see 1480).

For the example corresponding to this class loading view definition 1400, it is known that an entry trace point as specified at 1430 is encountered as the class loading operation begins, and that an exit trace point as specified at 1480 is encountered when the class loading operation finishes. In this example, another trace point has been set within the class loading code to emit the dynamically-determined value of the class name that corresponds to the class that is being loaded, and this trace point corresponds to the specification at 1450. The user may therefore learn the name of the class using a hover operation over a displayed view, where the hover pop-up display will then show the class name according to the specification at 1460.

Referring next to generating a graphical view for a Java method, it is noted that Java methods can be tracked using method traces, which are emitted using a corresponding one of the trace point definitions shown in FIG. 15. In each of these trace point definitions, a reserved component ID of "mt" is used (indicating that this trace point corresponds to a method). A predetermined list of trace point IDs is used when performing a method trace, and values in this list indicate both the type of trace point and the type of method. In the numeric value that is concatenated to the "mt." syntax (which would normally be the location for concatenating the trace point ID), values 0 through 5 indicate entry into a method, and further identify a particular type of method for which the execution is being entered. Trace point definition 1500, for example, corresponds to entry into a bytecode method, while trace point definition 1510 corresponds to entry into a native static method. On the other hand, when the numeric value concatenated to the "mt." syntax is 6 though 11, this indicates exit from a method and further identifies the particular type of method that is being exited. Trace point definition 1520, for example, corresponds to exit from a bytecode method, while trace point definition 1530 corresponds to exit from a native static method. Note that each of the trace point definitions in FIG. 15 contains placeholders, and the parameters at index values 0 and 1 of the parameter array contain the class name and method name, respectively.

As an example of displaying a view for a method trace, suppose it is desired to add a view that depicts run-time performance information for a collection of "add" methods in the class java.util.LinkedList. In the Java programming language, this collection comprises the add, addFirst, and addLast methods. A sample view definition that may be used for analyzing trace events from these methods is shown at 1600 in FIG. 16, as will now be described.

View definition 1600 specifies a name "LinkedList add methods" for the defined view. See 1610. The entry events definition 1620 indicates that a matching trace record is one in which the component ID has the value "mt", the trace point ID has any of the values "0, 1, 2, 3, 5", and a regular expression comparison succeeds in matching the string "java/util/LinkedList.add*" to a result of concatenating the parameters at index 0 (which stores the package name, in the case of a method trace) and index 1 (which stores the method name, in the case of a method trace), with a "." separator inserted in between these two values. See 1630. Note that the "*" symbol in the string at 1630 functions as a wildcard for matching, the operation of which is readily understood by those of ordinary skill in the art. With reference to the method trace point definitions in FIG. 15, it can be seen that the set of allowable trace point IDs "0, 1, 2, 3, 5" at 1630 represents an entry trace point in all method types except for compiled static.

The entry events definition 1620 also indicates that when a matching trace record is located in the trace, the parameter values having index 0 and 1 are to be extracted and concatenated, with a "." separator in between. See 1640. Thus, the package name and method name will be extracted and concatenated in this manner, in the example.

The exit events definition 1650 indicates that a matching trace record is one in which the component ID has the value "mt" and the trace point ID has any of the values "6, 7, 8, 9, 10, 11". See 1660. With reference to the method trace point definitions in FIG. 15, it can be seen that the set of allowable trace point IDs "6, 7, 8, 9, 10, 11" at 1660 represents an exit trace point in all method types (including compiled static).

Referring finally to generating a composite graphical view—that is, a view in which multiple views are shown on the same display—an example of syntax which may be used for defining such view is illustrated at 1700 in FIG. 17. In this example, an attribute of a "<composite>" element 1710 indicates that the views will overlap when displayed. A first "<view>" element 1720 identifies the first view that is to be displayed, and a second <view> element 1740 identifies a second view that is to be displayed. The "refers" attribute on the <view> elements, for example, may specify the name of an already-defined (and registered) view. (View definitions are preferably loaded and registered at system start-up, when the common view definitions file is being processed, as noted above with reference to Block 730 of FIG. 7.) The <view> element syntax may also provide for specifying one or more values that extend, or override, values defined in the referenced view. See the "<color>" child element at 1730, 1750 of FIG. 17.

It may be desirable to use a composite view to see how one operation is affecting another. For example, an operation within a business application may invoke a database transaction, causing the business application to temporarily suspend its processing until the database transaction completes. Presenting a composite view having the operation from the business application as well as the database transaction may be useful to see how the performance of the database transaction is affecting the performance of the operation from the business application. If the database transaction times out for some reason, for example, this will likely cause the operation from the business application to be viewed as an outlier.

In one approach, a composite view may be displayed by dividing the GUI space into two portions and rendering a view in each portion. Preferably, each view uses the same x-axis scale when the GUI is divided into an upper and lower portion. In the database transaction scenario, for example, the view in an upper portion of the GUI may display events for the database transaction while the view in a lower portion of the GUI displays information for the business operation. (Note that each view preferably maintains its own hover capability.)

Referring now to the sample code in FIGS. 18-20, one approach to processing incoming trace data at run time to display a view will now be described. According to an embodiment of the present invention, view definitions from the common view definitions file are loaded into memory as objects, and these objects are used to parse the incoming trace records to generate various views and display them. (Note that a particular incoming trace record may be compared to the <match> and/or <info> elements within multiple view definitions.)

FIG. 18 shows a sample data structure format that corresponds to a TracePoint object. In this example, the object contains a type, a time stamp, a thread ID, a component ID, a trace point ID, and a parameter array named "params". These values have been discussed, above, as being generated when a trace point is executed.

FIG. 19 provides sample code for processing a trace event. As noted by the included comments, a "matches" method returns a true value if the trace event being analyzed matches a definition from a <match> block of a registered view definition, and the "getKey" method extracts a key value from the matched trace event as defined in a <key> block of the view definition that contains the matched <match> block. With reference to <key> block 540 of FIG. 5, for example, the "getKey" method will return the parameter value at index 0 in the parameter array. The "getInfo" method returns the information that is extracted from the matched trace event, according to the specification in the <info> block of the view definition that contains the matched <match> block. With reference to <info> block 550 of FIG. 5, for example, the "getInfo" method will return the hexadecimal number stored at index 0 in the parameter array.

FIG. 20 provides sample code for processing a view definition to generate a view. Note that each of the defined views from the common view definitions file is loaded, and the "processIncomingTracePoint" method shown in FIG. 20 iterates over this collection of view definitions for a particular incoming trace event to determine whether the trace event matches any of the <match> or <info> definitions from the view definitions. In particular, a trace event is first compared to the definitions for entry events, and then to the definitions for informational events, and then to the definitions for exit events, and corresponding processing is performed each time there is a match (as can be seen by review of the code in FIG. 20). Notably, the processing that is performed when an exit event is matched includes calculating elapsed time and adding data to the list of events to be displayed. By iterating over the collection of view definitions in this manner, every view is automatically updated with new values as corresponding trace data is located. The burden on the user is therefore reduced through creation and use of event definitions as disclosed herein, and the likelihood that the user can locate the underlying cause of outliers which may be present in the system is increased.

Figure 21:
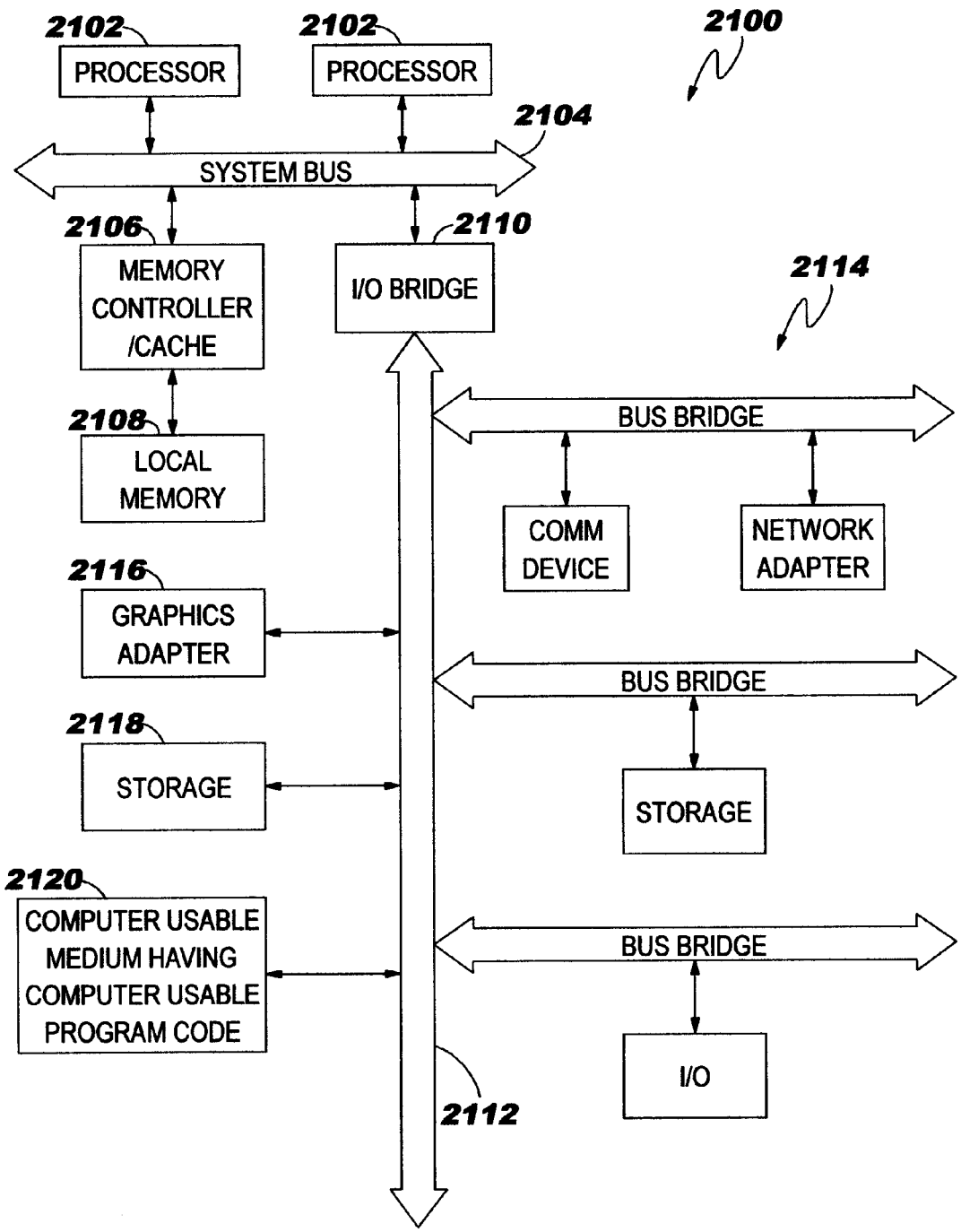
FIG. 21 depicts a data processing system suitable for storing and/or executing program code.

Referring now to FIG. 21, a block diagram of a data processing system is depicted in accordance with the present invention. Data processing system 2100, such as one of the processing devices described herein, may comprise a symmetric multiprocessor ("SMP") system or other configuration including a plurality of processors 2102 connected to system bus 2104. Alternatively, a single processor 2102 may be employed. Also connected to system bus 2104 is memory controller/cache 2106, which provides an interface to local memory 2108. An I/O bridge 2110 is connected to the system bus 2104 and provides an interface to an I/O bus 2112. The I/O bus may be utilized to support one or more buses 2114 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 2116, storage 2118, and a computer usable storage medium 2120 having computer usable program code embodied thereon. The computer usable program code may be executed to execute any aspect of the present invention, as have been described herein.

The data processing system depicted in FIG. 21 may be, for example, an IBM System p® system, a product of International Business Machines Corporation in Armonk, N.Y., running the Advanced Interactive Executive (AIX®) operating system. An object-oriented programming system such as Java may run in conjunction with the operating system and provides calls to the operating system from Java® programs or applications executing on data processing system. ("System p" and "AIX" are registered trademarks of International Business Machines Corporation in the United States, other countries, or both. "Java" is a registered trademark of Oracle America, Inc., in the United States, other countries, or both.)

Figure 22:
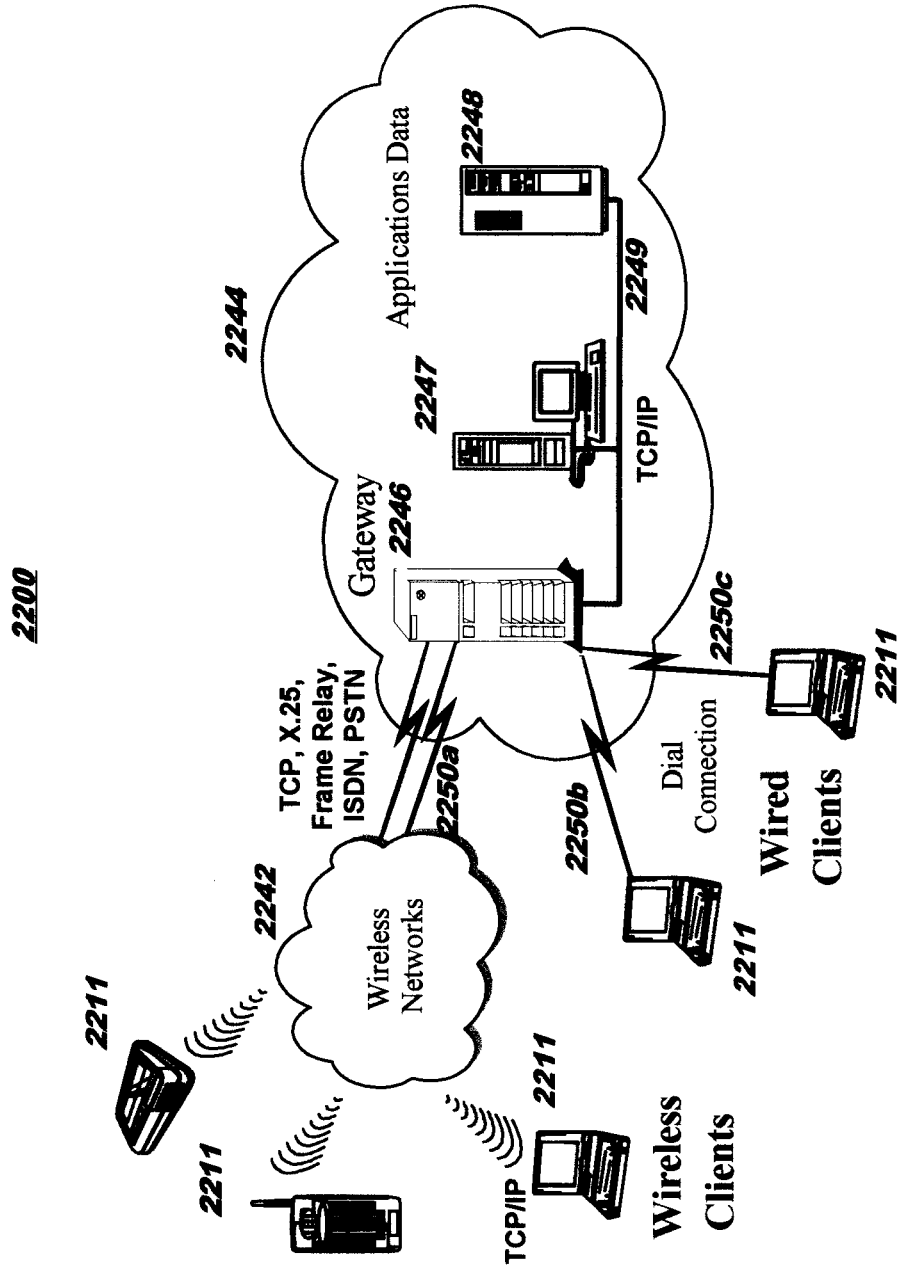
FIG. 22 depicts a representative networking environment in which one or more embodiments of the present invention may be used.

FIG. 22 illustrates a data processing network environment 2200 in which the present invention may be practiced. The data processing network 2200 may include a plurality of individual networks, such as wireless network 2242 and wired network 2244. A plurality of wireless devices 2210 may communicate over wireless network 2242, and a plurality of wired devices, shown in the figure (by way of illustration) as workstations 2211, may communicate over network 2244. Additionally, as those skilled in the art will appreciate, one or more local area networks ("LANs") may be included (not shown), where a LAN may comprise a plurality of devices coupled to a host processor.

Still referring to FIG. 22, the networks 2242 and 2244 may also include mainframe computers or servers, such as a gateway computer 2246 or application server 2247 (which may access a data repository 2248). A gateway computer 2246 serves as a point of entry into each network, such as network 2244. The gateway 2246 may be preferably coupled to another network 2242 by means of a communications link 2250a. The gateway 2246 may also be directly coupled to one or more workstations 2211 using a communications link 2250b, 2250c, and/or may be indirectly coupled to such devices. The gateway computer 2246 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks, and "System i" is a trademark, of IBM in the United States, other countries, or both.)

The gateway computer 2246 may also be coupled 2249 to a storage device (such as data repository 2248).

Those skilled in the art will appreciate that the gateway computer 2246 may be located a great geographic distance from the network 2242, and similarly, the workstations 2211 may be located some distance from the networks 2242 and 2244, respectively. For example, the network 2242 may be located in California, while the gateway 2246 may be located in Texas, and one or more of the workstations 2211 may be located in Florida. The workstations 2211 may connect to the wireless network 2242 using a networking protocol such as the Transmission Control Protocol/Internet Protocol ("TCP/IP") over a number of alternative connection media, such as cellular phone, radio frequency networks, satellite networks, etc. The wireless network 2242 preferably connects to the gateway 2246 using a network connection 2250a such as TCP or User Datagram Protocol ("UDP") over IP, X.25, Frame Relay, Integrated Services Digital Network ("ISDN"), Public Switched Telephone Network ("PSTN"), etc. The workstations 2211 may connect directly to the gateway 2246 using dial connections 2250b or 2250c. Further, the wireless network 2242 and network 2244 may connect to one or more other networks (not shown), in an analogous manner to that depicted in FIG. 22.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method of creating views from trace data, comprising:

dynamically creating a view definition for generating a trace view during run-time execution in a computing environment, comprising:

determining a plurality of trace point definitions which are currently in effect for the computing system, each of the trace point definitions corresponding to one of a plurality of trace points and defining what to capture in a trace record if the corresponding trace point is encountered during the run-time execution in the computing environment;

extracting, from each of the determined trace point definitions, a component identifier specified therein;

presenting, on a user interface, a view customization, each of the extracted component identifiers being selectable therein;

receiving, from a user interacting with the presented view customization, a selection of one of the selectable component identifiers;

responsive to the selection of the component identifier, determining each of a plurality of trace point identifiers which are found in any of the determined trace point definitions that specify the selected component identifier therein;

updating the presented view customization, such that each of the determined trace point identifiers is selectable therein;

receiving, from the user interacting with the updated presented view customization, a selection of a first one and a second one of the selectable trace point identifiers;

inserting the selected component identifier and the first selected trace point identifier into the view definition to thereby specify how to match a trace record that corresponds to an entry point of a monitored operation for the selected component identifier; and inserting the selected component identifier and the second selected trace point identifier into the view definition to thereby specify how to match a different trace record that corresponds to an exit point of the monitored operation for the selected component identifier;

comparing a plurality of trace records to the specifications in the view definition to locate each of the matching trace records and each of the matching different trace records; and upon locating the matching trace records and the matching different trace records, using the located trace records and the located different trace records when generating the trace view that includes the monitored operation.

2. The method according to claim 1, wherein:

at least one of the specification of how to match the trace record and the specification of how to match the different trace record further comprises a specification of how to extract therefrom a thread identifier that must be present for the match to occur, the extracted thread identifier being usable for correlating ones of the matching trace records to ones of the matching different trace records when the thread identifier extracted from one of the matching trace records is different from the thread identifier extracted from one of the matching different trace records.

3. The method according to claim 1, wherein:

at least one of the specification of how to match the trace record and the specification of how to match the different trace record further comprises a specification of information to be extracted from the trace record or the different trace record, respectively, upon the locating thereof; and further comprising using the extracted information in a separate display that is displayed, in association with a display of the generated trace view, responsive to a user gesture performed by the user from the display of the generated trace view.

4. The method according to claim 3, wherein the separate display is a hover pop-up display and the user gesture is a hover action.

5. The method according to claim 1, further comprising:

adding, to the extracted component identifiers for the presenting, a predetermined component identifier usable for selecting a method trace; and responsive to receiving the predetermined component identifier as the selection of one of the selectable component identifiers, adding each of a plurality of predetermined method trace point identifiers to the determined trace point identifiers for the updating.

6. The method according to claim 1, further comprising:

detecting creation of a new trace record, subsequent to generating the trace view;

comparing the detected new trace record to the specifications in the dynamically-created view definition to determine if the new trace record corresponds to either of the entry point or the exit point, and if so, using the new trace record when generating an automatically-updated version of the trace view.

7. A system for creating views from trace data, comprising: a computer comprising a processor; and instructions which are executable, using the processor, to implement functions comprising:

dynamically creating a view definition for generating a trace view during run-time execution in a computing environment, comprising:

determining a plurality of trace point definitions which are currently in effect for the computing system, each of the trace point definitions corresponding to one of a plurality of trace points and defining what to capture in a trace record if the corresponding trace point is encountered during the run-time execution in the computing environment;

extracting, from each of the determined trace point definitions, a component identifier specified therein;

presenting, on a user interface, a view customization, each of the extracted component identifiers being selectable therein;

receiving, from a user interacting with the presented view customization, a selection of one of the selectable component identifiers;

responsive to the selection of the component identifier, determining each of a plurality of trace point identifiers which are found in any of the determined trace point definitions that specify the selected component identifier therein;

updating the presented view customization, such that each of the determined trace point identifiers is selectable therein;

receiving, from the user interacting with the updated presented view customization, a selection of a first one and a second one of the selectable trace point identifiers;

inserting the selected component identifier and the first selected trace point identifier into the view definition to thereby specify how to match a trace record that corresponds to an entry point of a monitored operation for the selected component identifier; and inserting the selected component identifier and the second selected trace point identifier into the view definition to thereby specify how to match a different trace record that corresponds to an exit point of the monitored operation for the selected component identifier;

comparing a plurality of trace records to the specifications in the view definition to locate each of the matching trace records and each of the matching different trace records; and upon locating the matching trace records and the matching different trace records, using the located trace records and the located different trace records when generating the trace view that includes the monitored operation.

8. The system according to claim 7, wherein:

at least one of the specification of how to match the trace record and the specification of how to match the different trace record further comprises a specification of how to extract therefrom a thread identifier that must be present for the match to occur, the extracted thread identifier being usable for correlating ones of the matching trace records to ones of the matching different trace records when the thread identifier extracted from one of the matching trace records is different from the thread identifier extracted from one of the matching different trace records.

9. The system according to claim 7, wherein:

at least one of the specification of how to match the trace record and the specification of how to match the different trace record further comprises a specification of information to be extracted from the trace record or the different trace record, respectively, upon the locating thereof; and further comprising using the extracted information in a separate display that is displayed, in association with a display of the generated trace view, responsive to a user gesture performed by the user from the display of the generated trace view.

10. A computer program product for creating views from trace data, the computer program product comprising:
a non-transitory computer readable storage medium having computer readable program code embodied therein, the computer readable program code configured for:
dynamically creating a view definition for generating a trace view during run-time execution in a computing environment, comprising:
determining a plurality of trace point definitions which are currently in effect for the computing system, each of the trace point definitions corresponding to one of a plurality of trace points and defining what to capture in a trace record if the corresponding trace point is encountered during the run-time execution in the computing environment;
extracting, from each of the determined trace point definitions, a component identifier specified therein;
presenting, on a user interface, a view customization, each of the extracted component identifiers being selectable therein;
receiving, from a user interacting with the presented view customization, a selection of one of the selectable component identifiers;
responsive to the selection of the component identifier, determining each of a plurality of trace point identifiers which are found in any of the determined trace point definitions that specify the selected component identifier therein;
updating the presented view customization, such that each of the determined trace point identifiers is selectable therein;
receiving, from the user interacting with the updated presented view customization, a selection of a first one and a second one of the selectable trace point identifiers;
inserting the selected component identifier and the first selected trace point identifier into the view definition to thereby specify how to match a trace record that corresponds to an entry point of a monitored operation for the selected component identifier; and
inserting the selected component identifier and the second selected trace point identifier into view definition to thereby specify how to match a different trace record that corresponds to an exit point of the monitored operation for the selected component identifier;
comparing a plurality of trace records to the specifications in the view definition to locate each of the matching trace records and each of the matching different trace records; and
upon locating the matching trace records and the matching different trace records, using the located trace records and the located different trace records when generating the trace view that includes the monitored operation.

11. The computer program product according to claim 10, wherein:
at least one of the specification of how to match the trace record and the specification of how to match the different trace record further comprises a specification of how to extract therefrom a thread identifier that must be present for the match to occur, the extracted thread identifier being usable for correlating ones of the matching trace records to ones of the matching different trace records when the thread identifier extracted from one of the matching trace records is different from the thread identifier extracted from one of the matching different trace records.

* * * * *